United States Patent [19]

Juarez

[11] Patent Number: 5,053,686
[45] Date of Patent: Oct. 1, 1991

[54] DIRECT CURRENT BRUSHLESS MOTOR FOR FANS, PUMPS AND SIMILAR EQUIPMENTS

[75] Inventor: Fernando Juarez, Barcelona, Spain

[73] Assignee: Halsall Products Limited, London, United Kingdom

[21] Appl. No.: 514,194

[22] Filed: Apr. 25, 1990

Related U.S. Application Data

[63] Continuation-in-part of Ser. No. 272,553, Nov. 17, 1988, abandoned.

[30] Foreign Application Priority Data

Nov. 18, 1987 [IT] Italy ................................ 67986 A/87

[51] Int. Cl.⁵ .............................................. H02P 6/02
[52] U.S. Cl. .................................... 318/254; 318/430; 318/434; 318/685
[58] Field of Search ................ 318/138, 254, 439, 685, 318/696, 430, 434

[56] References Cited

U.S. PATENT DOCUMENTS

| | | | |
|---|---|---|---|
| 3,769,555 | 10/1973 | Dolbachian et al. | 318/138 |
| 4,355,255 | 10/1982 | Herr et al. | 310/254 |
| 4,403,177 | 9/1983 | Weber et al. | 318/254 |
| 4,424,471 | 1/1984 | Collen | 318/138 |
| 4,577,139 | 3/1986 | Reinhardt et al. | 318/254 |
| 4,641,066 | 2/1987 | Nagata et al. | 318/254 |
| 4,656,553 | 4/1987 | Brown | 318/254 X |
| 4,673,849 | 6/1987 | Sears et al. | 318/272 |
| 4,678,973 | 7/1987 | Elliott et al. | 318/254 |
| 4,743,815 | 5/1988 | Gee et al. | 318/254 |
| 4,912,378 | 3/1990 | Vukosavic | 318/254 |

*Primary Examiner*—Bentsu Ro
*Attorney, Agent, or Firm*—Bachman & LaPointe

[57] ABSTRACT

A direct current, brushless, biphase motor with four unipolar windings and electronic drive, presents a geometry of the teeth and of the magnet generated field so that in each winding a trapezoidal e.m.f. is generated to allow the electronic drive to feel or sense the best switching point on the oblique side of such trapezoidal wave without the use of Hall probes; the two phases are embodied to obtain conduction on 180° per winding, thus as two single-phases in parallel; the two single-phases may be embodied in a different way to permit the electronic selection of the use of three distinct motors in the motor: first single-phase, second single-phase and third biphase.

10 Claims, 14 Drawing Sheets

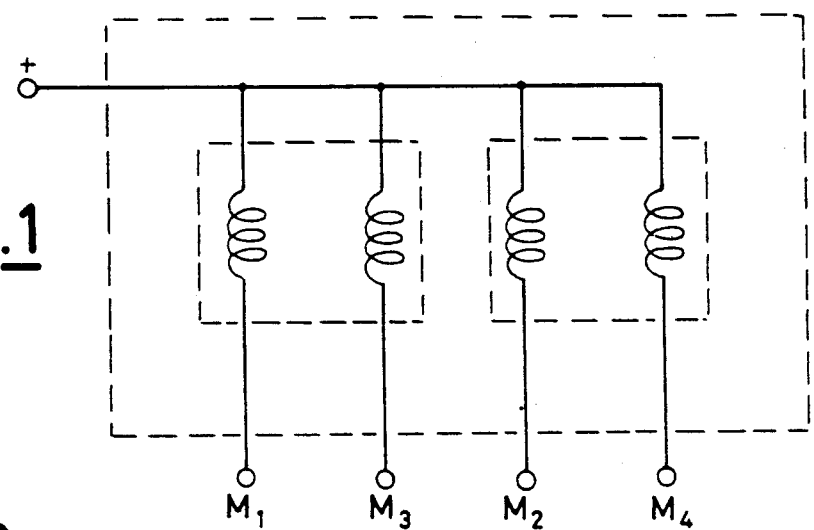
Fig.1
Fig.2
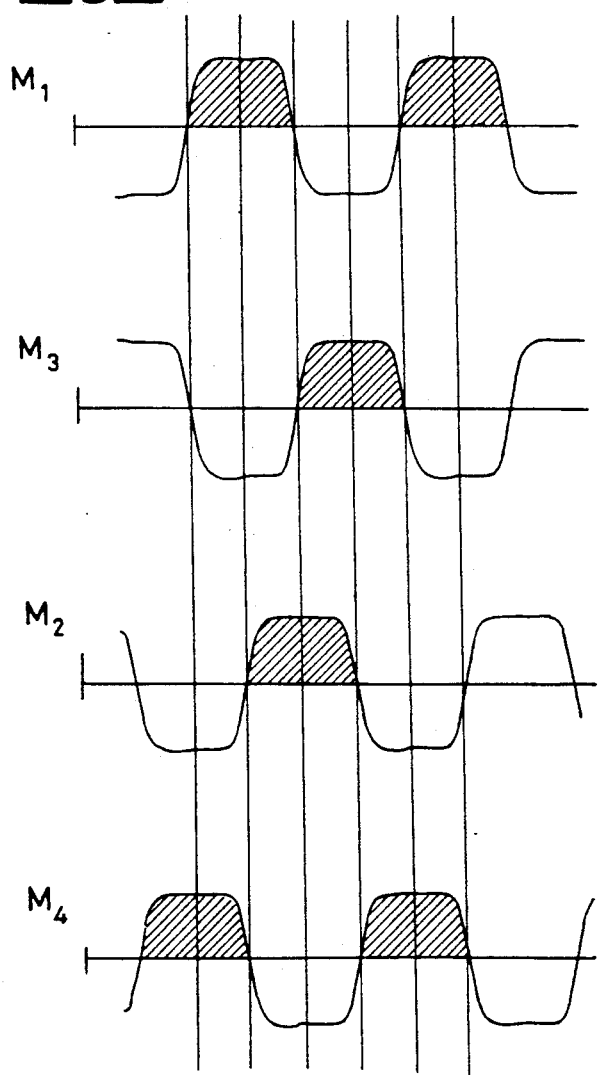
Fig.3
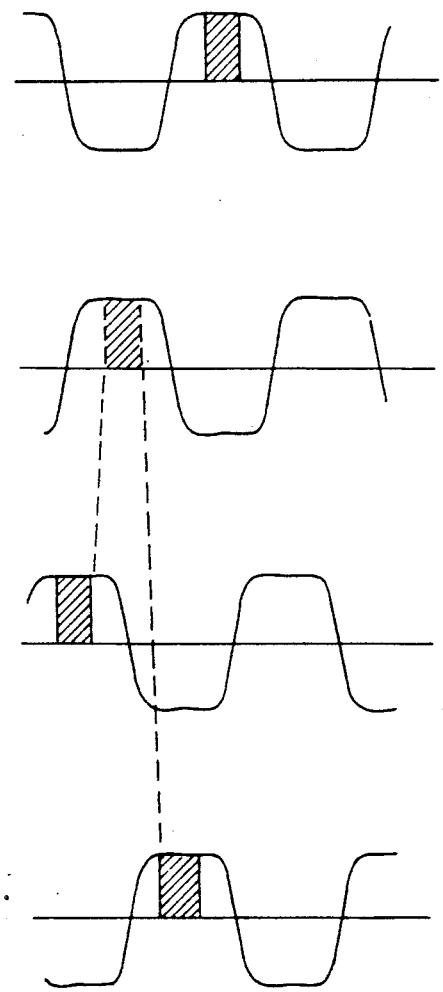

Fig.9
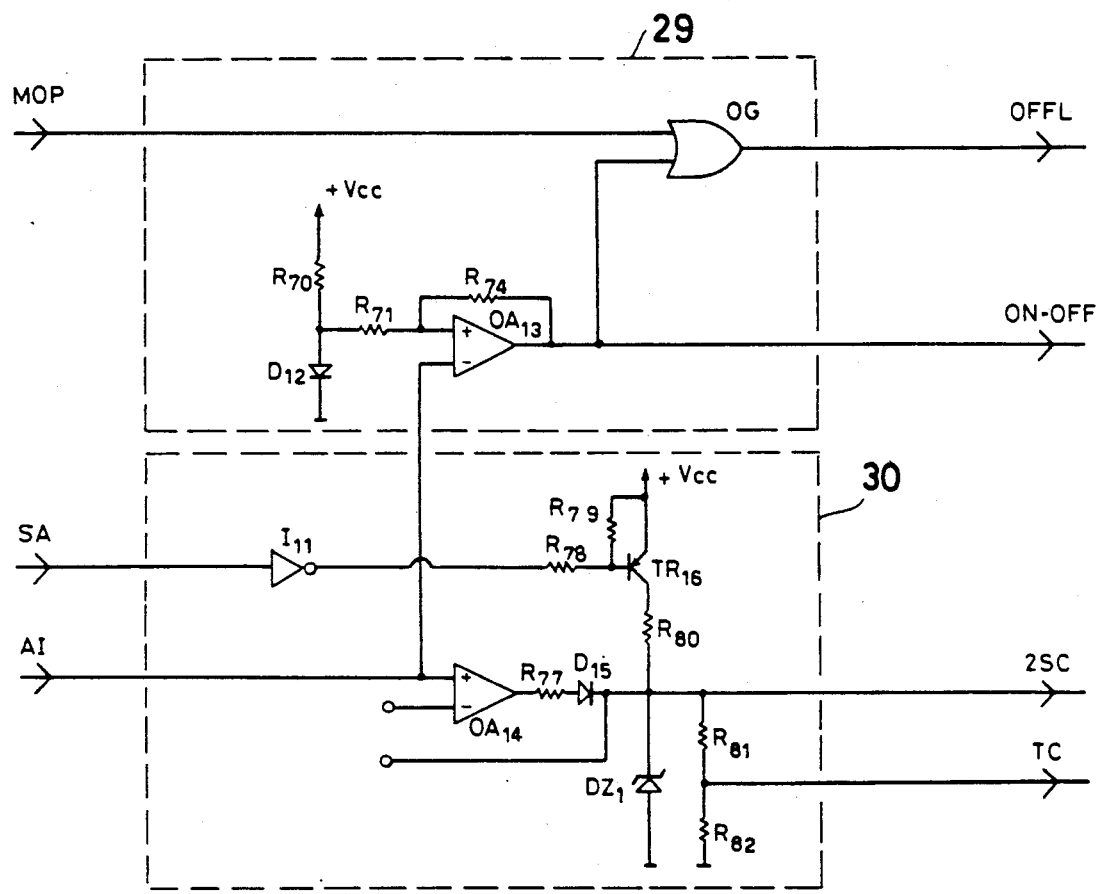
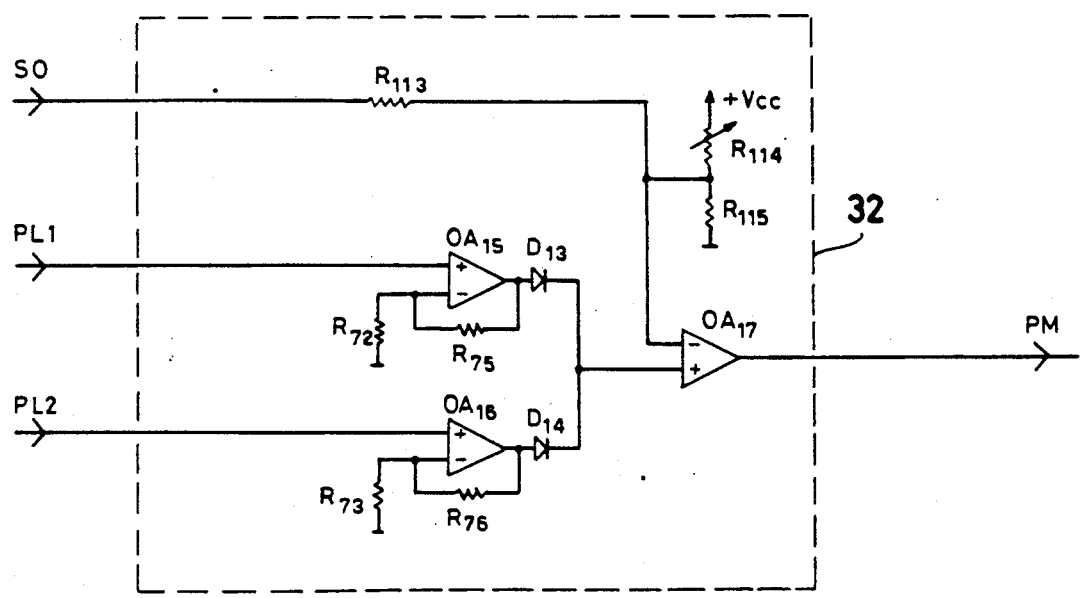

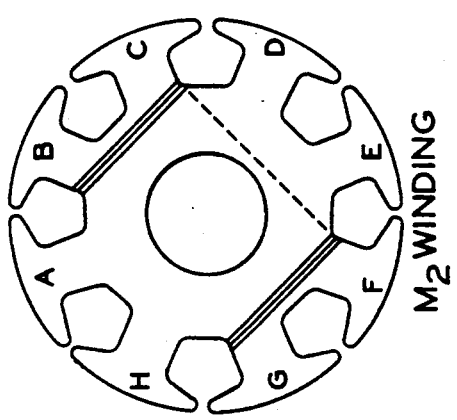
FIG-15c  M₂ WINDING
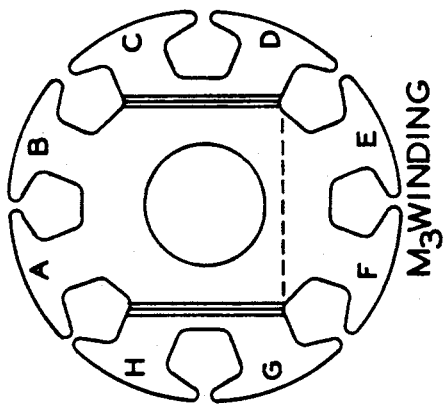
STATOR STRUCTURE
FIG-15B  M₃ WINDING
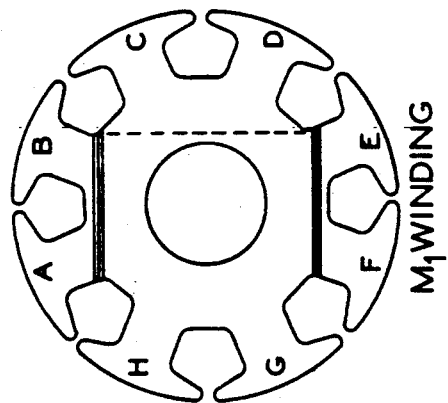
FIG-15A  M₁ WINDING
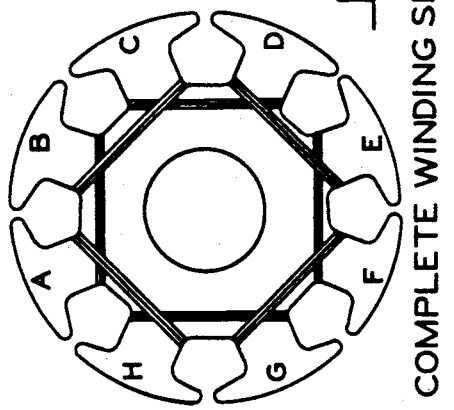
FIG-15E  COMPLETE WINDING SKETCH
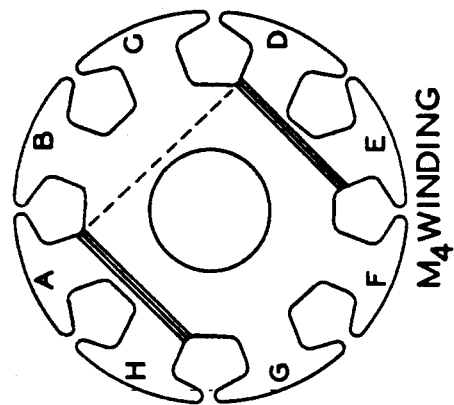
FIG-15D  M₄ WINDING

BEMF GENERATION ered in winding $M_1$ is illustrated as a function of rotor motion. For the sake of clarity, the magnets on the rotor cap which have north facing inwards are painted in black while the magnets having south wound magnets are shown in white. As can been seen in FIG. 16, the BEMF wave form and the winding are essentially trap-

DIRECT CURRENT BRUSHLESS MOTOR FOR FANS, PUMPS AND SIMILAR EQUIPMENTS

CROSS-REFERENCE TO RELATED APPLICATION

This application is a continuation-in-part of U.S. patent application Ser. No. 272,553, filed Nov. 17, 1988, now abandoned.

BACKGROUND OF THE INVENTION

The present invention is drawn to an electronically driven, brushless, direct current motor system for motor fans, pumps and similar equipment. The following are some of the advantages of brushless motors with respect to D.C. commutator motors: (1) life and reliability are ten times higher; (2) lower mechanical and electric noise; (3) competitive efficiency for equal power and materials; (4) possibility to realize the motor in reduced dimensions or in "flat" geometries with an internal or external rotor (the best solution in the case of motor fans both from a dimension point of view and from that of the cooling of the copper); (5) higher endurance to work environment (gas, water or fuel cause problems in traditional commutator types in some applications); and (6) the possibility to drive the motor without interfaces by a central electronic multifunction unit.

SUMMARY OF THE INVENTION

The present invention proposes a motor of this type offering competitive quality and cost when compared to the ones utilized at present with equal production means. The foregoing results from a design offering the following advantages to performance:

(a) less expensive motor to improve the utilization of copper (50% instead of 33% operation of the unipolar three-phase) and use of a complex of circuits restoring switching energy;

(b) low cost signal electronics as a simple logic realized in a latched integrated circuit is (c) less expensive and more reliable power electronics using four components, each operating with 50% of the work and take-off current with respect to the solution realized by competition;

(d) availability of a highly competitive, compact 2 (3) speed version, with analog or digital driving and very low dissipation of power components; and (e) linear controls (not PWM) with closed speed loop or optional torque, and accurate overheating protections and a latched circuit generating bidirectional torque pulses to improve starting conditions.

The above advantages may be obtained from the motor according to the present invention, that is a direct current brushless, electronically driven motor, in biphase type with four unipolar windings. The motor is characterized in that the geometry of the teeth and of the magnet generated field is such that in each winding a trapezoidal e.m.f. is generated to allow the electronic drive to feel or sense the best switching point on the oblique side of such trapezoidal wave without the use of Hall probes. Furthermore, the two phases are embodied to obtain conduction on 180° per winding, thus as two single-phase in parallel. Furthermore, the two single-phases could be embodied each with different winding parameters to permit the electronic selection of the use of three distinct motors into the motor: first single-phase, second single-phase and third biphase.

BRIEF DESCRIPTION OF THE DRAWINGS

With reference to the enclosed drawings, the motor and the electronic driving is described as follows:

FIG. 1 is an electric diagram of the motor;

FIGS. 3 are wave forms of the motor according to the invention and of a motor according to known techniques, respectively;

FIGS. 15d–15e illustrate the stator structure of the motor; and

DETAILED DESCRIPTION

FIG. 1 illustrates the motor of the present invention having a biphase structure with four unipolar windings.

Figure 14:
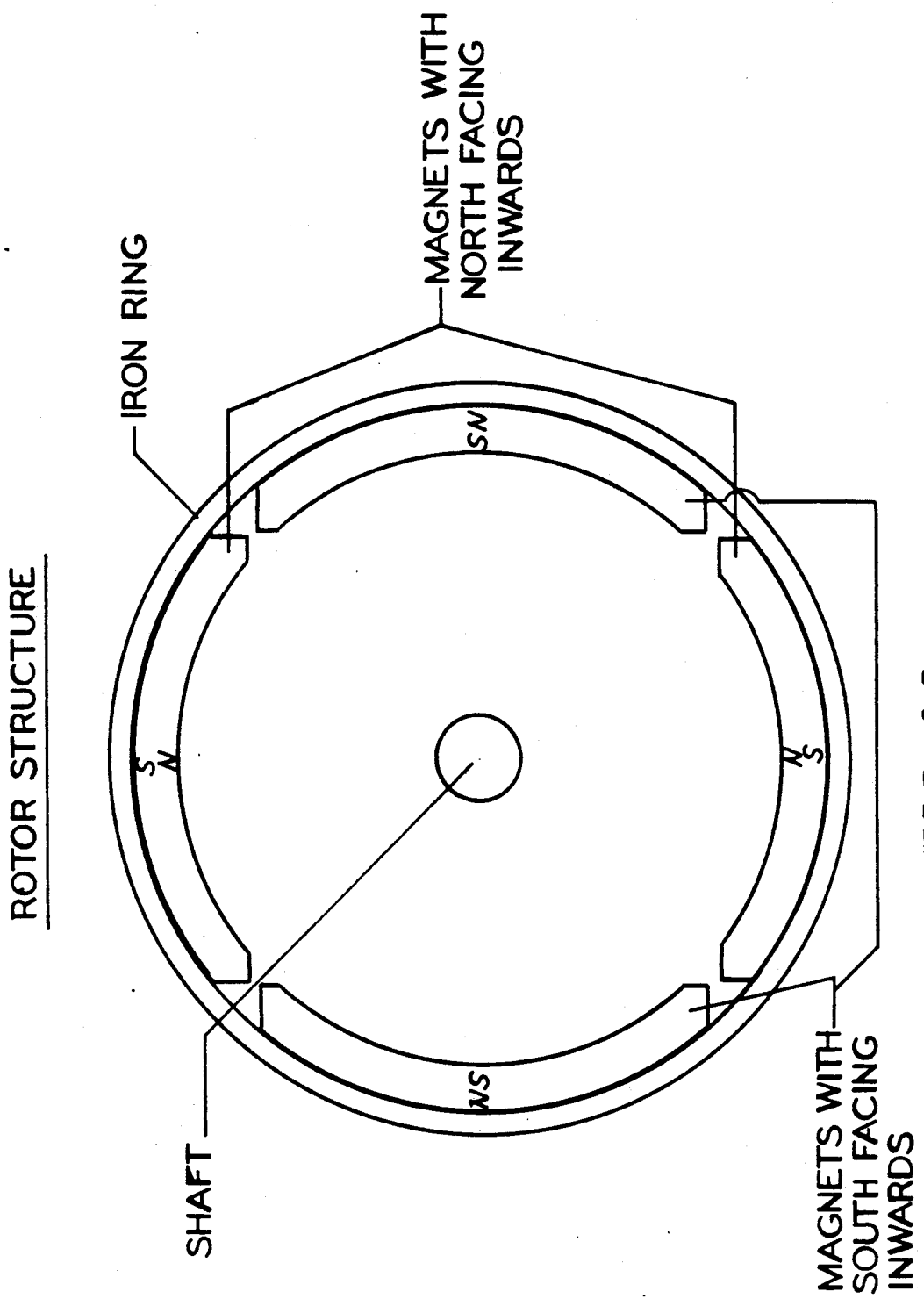
FIG. 14 illustrates the rotor structure of the motor.
Figure 16E:
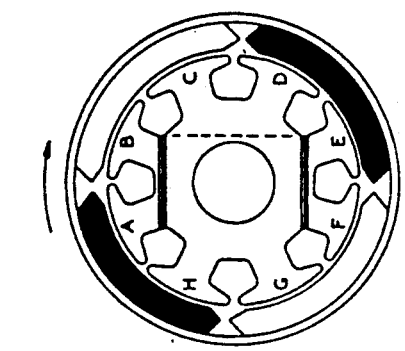
FIGS. 16, 16A–16E illustrate the relative positions of the rotor and stator of FIGS. 14 and 15 for BEMF generation.
Figure 16D:
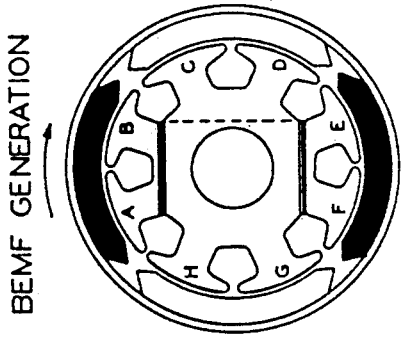
Figure 16C:
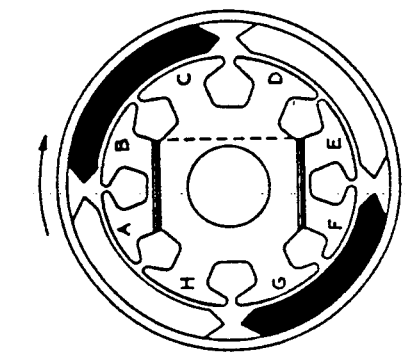
Figure 16B:
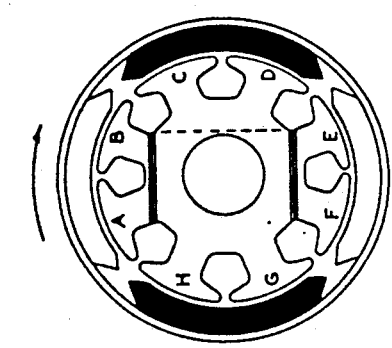
Figure 16A:
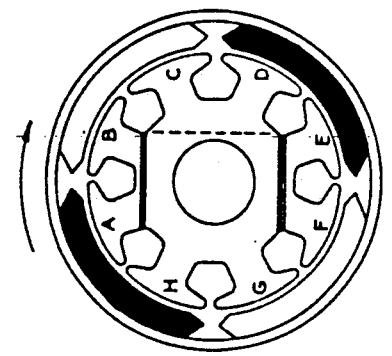
Figure 16:
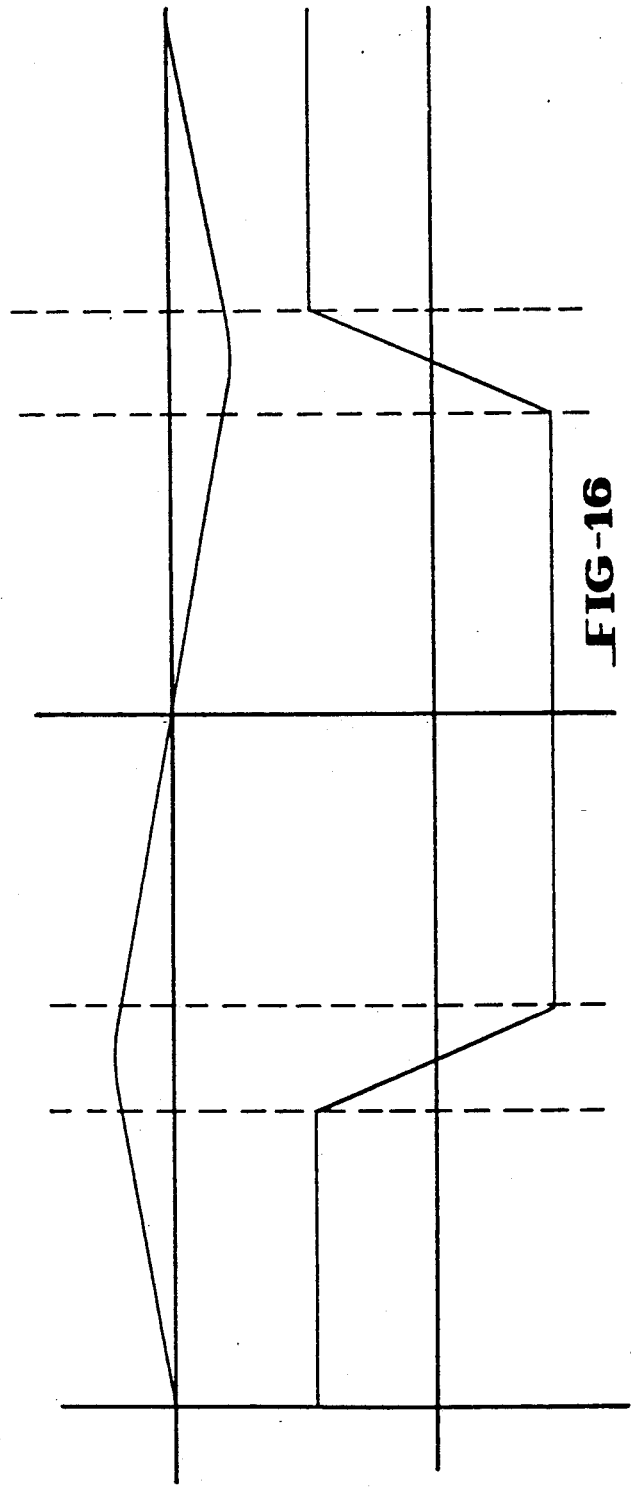

With reference to FIGS. 14–16, the structure of the motor of the present invention and the BEMF generation will be discussed. The motor is comprised of a rotor structure shown in FIG. 14 and a stator structures as shown in FIGS. 15a–15e. The rotor is composed of an iron cap 110 supporting the motor shaft 112 as shown in cross section in FIG. 14. Four magnets 114, 116, 118 and 120, respectively, are fastened to the inner side of the cap 110. Magnets 114 and 118 as shown in FIG. 14 have their north poles facing inwards whereas magnets 116 and 118 have their south poles facing inwards.

With reference to FIGS. 15a–15d, the stator is wound with four windings $M_1$, $M_2$, $M_3$, and $M_4$. The $M_1$ winding is wound and current flows in such a way so as to generate a north polarity on shoes ab and ef and south polarity on shoes cd and gh. Winding $M_3$ is wound and current flows in such a way so as to generate a north polarity on shoes cd and gh and south polarity on shoes ab and ef. As will be discussed hereinbelow with reference to FIG. 14, windings $M_1$ and $M_3$ are driven "ON" by electronic control wherein they are 180° out of phase. Windings $M_2$ and $M_4$ are illustrated in FIGS. 15c and 15d. Winding $M_2$ is driven 90 electrical degrees out of phase with respect to $M_4$. As a result of the winding arrangements shown in FIGS. 15a–15d, windings $M_1$ and $M_3$ are coupled to the same magnetic flux in an electrical transformer and the same holds true for windings $M_2$ and $M_4$. The complete winding sketch is shown in FIG. 15e.

With reference to FIG. 16, the BEMF generation will be described. As can been seen in FIG. 16, one complete cycle which corresponds to a rotor revolution has been illustrated. The magnetic flux and BEMF generated in winding $M_1$ is illustrated as a function of rotor motion. For the sake of clarity, the magnets on the rotor cap which have north facing inwards are painted in black while the magnets having south wound magnets are shown in white. As can been seen in FIG. 16, the BEMF wave form and the winding are essentially trapezoidal according to the flux generated by a constant rotor speed.

The motor may operate as two single-phase in parallel. Each of the four windings has conduction on 180° electrical (see FIG. 2). The biphase brushless motors of this type usually conduct 90° electrical for each winding (see FIG. 3).

The motor operating in biphase will thus develop about double maximum power if compared to the traditional utilization of same (conduction of about 90° electrical).

With equal mechanical power, it can be obtained that, as two phases are always ON, the total current absorbed is divided between the two power components, each employing half the current with respect to the type of biphase utilized in a traditional way and to the three-phase realized on three unipolar windings. It will be noted, as the description follows, that a particular type of electronic drive will be required for the utilization of the motor in highly efficient conditions; this electronic drive is in turn subject to a particular motor embodiment.

The embodiment (wire section, number of turns) of $M_1$, $M_3$ (two windings/unipolar phases of the first single-phase circuit realized in the motor) may be different from $M_2$, $M_4$ (the other two windings/unipolar phases of the second single-phase circuit realized in the motor and wound rotated of 90° electrical with respect to the first one).

This embodiment allows one to combine three motors into one (two single-phase and one biphase) with a complex of control circuits which are going to be described:

First operation as single-phase with max $P_1$ power (utilizing only the first single-phase $M_1$, $M_3$).

Second operation as single-phase with max $P_2$ power different from $P_1$ (utilizing only the second single-phase $M_2$, $M_4$).

Third operation as biphase with both the single-phases "ON" are a Pmax=K ($P_1+P_2$).

The above-mentioned three ways of operation with motor loads like fans or pumps effectively correspond to three different speed working points.

The main value of this motor is that three working speeds may be obtained (for the above-mentioned loads) with power drive components always operating in saturation and not in "PWM" (pulse width modulation) or in "linear".

Figure 4:
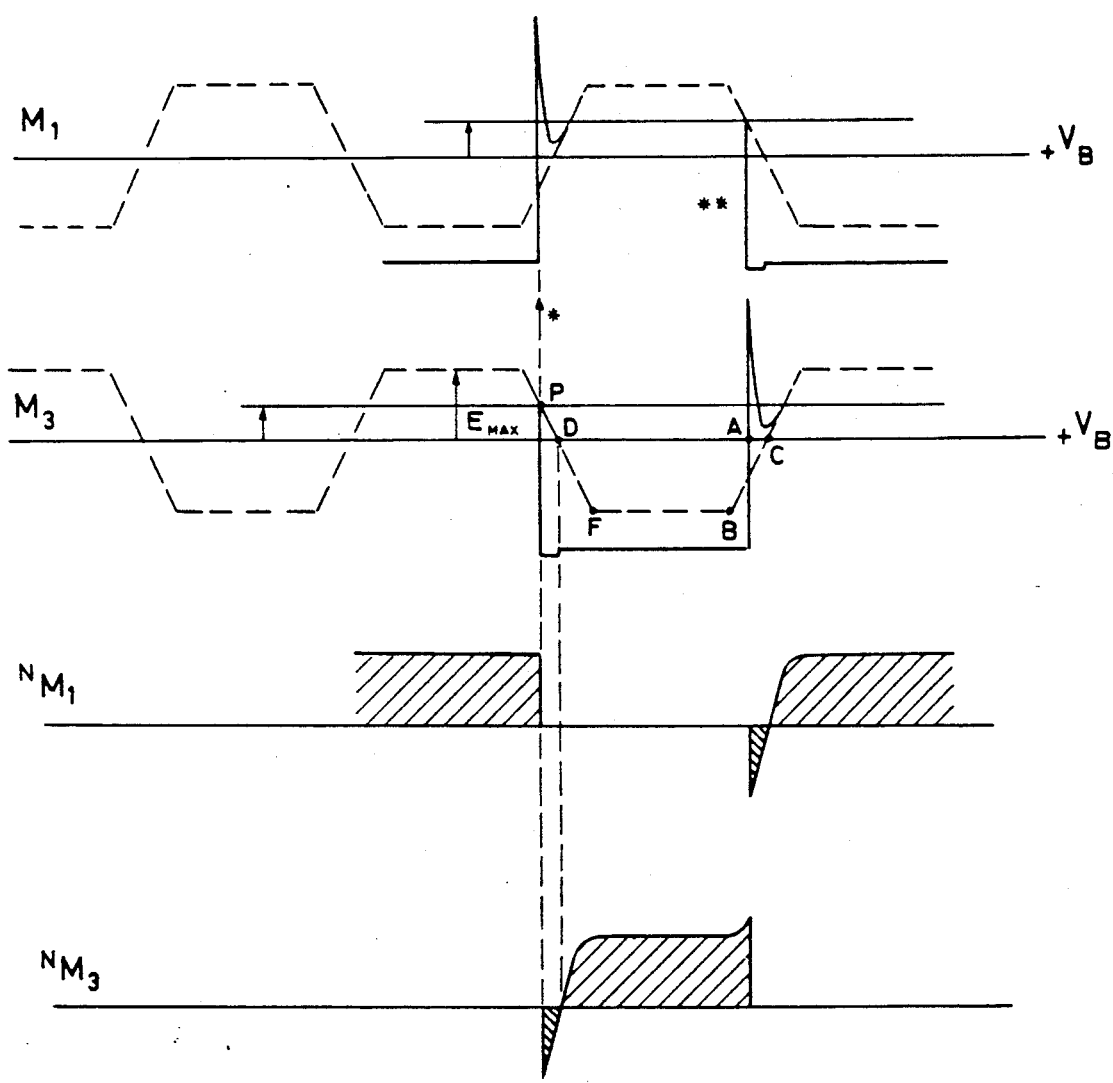
FIG. 4 is another diagram of the wave forms of the motor according to the invention.

The above solution involves a minimum dissipated power on the dissipator with all the conditions of power/speed mentioned. An advantage on operating costs is derived as well as the possibility to realize smaller motor/electronic units offering higher performance with respect to known solutions. We emphasize that said known solutions may realize different speed either with highly dissipating "linear" control, or in "PWM" which is electrically and sometimes mechanically noisy, and in any case more expensive and more dissipating for the power components. An embodiment regarding magnetization geometry of permanent magnets coupled with a stator pole horn geometry to obtain an essentially trapezoidal electromotive force wave form in each winding has been realized (see FIG. 4).

The ratio AC/DC, in particular, must be realized as a compromise between the following opposed requirements:

(a) Take to the maximum the section FB/DC to have more mean E with equal materials and thus more efficiency.

(b) Have a suitable AC/DC to enable the electronic drive—see logic for the detection of rotor position and advance circuit for high efficiency of motor—to identify the switching area as lowering of E from its E max value and to obtain an advance on the passage by the zero of E (point D) to get the maximum efficiency from the work of the motor. Said switching advance (e.g. FIG. 4, point P) generates these following effects all in the right direction to improve motor performance and efficiency:

(A) accelerates transient in the initial section DF of switching thus giving more "i", that is power, and to decrease the in line current harmonics overlapped to D.C. and linked to the form/duration of the transient.

(B) cuts the peak current which would take place in the final section BC because of lowering of E. This fact increases the efficiency because this "peak" would only give dissipated power passing with a low $E_2$ (low Ei, high Ri). It contributes to an efficient switching as it avoids that the stored energy $1/2LI^2$ to be restored, be uselessly high. And finally, it still decreases the current harmonic contents by spreading i, avoiding the final peak.

(C) allows to restore $1/2LI^2$ energy (e.g. $1/2LI_{M1}^2$) through the transfer by means of the transformer on the 180° winding (e.g. $M_3$). In fact, the induced voltage for instance in $M_3$, due to the different winding direction, by the switching off of $M_1$ is such to make the current circulate in $M_3$ through a diode placed in parallel to "active" power component. "i" in $M_3$ finds itself with E induced in $M_3$ at that moment in such phase relation as to generate active power, due to the advance with which the switching occurred, and it permits then to restore efficiently the magnetic energy stored in $M_1$ during its ON cycle.

(D) limits the inherent error in "reading" E in the OFF phase and linked to Di/DT in the 180° phase which is conducting (e.g $V_{M3OFF}=E_{M3}+MDiM1/DT$). This signal M DiM1/DT overlapped to E may give an incorrect information on the correct instant of switching and the more it is negligible the smaller is Di/DT in the switching instant, that is when the advance is "correct". It avoids the "peak" in the section BC (as already mentioned) in the conducting phase.

The choice of the above-described motor structure, apart from the advantages at points A, B and C, offers the availability of "clean" wave forms as the windings $M_1$, $M_3$ being wound at 90° with $M_2$, $M_4$ do not feel the effects (or only in a partial way) of mutual induction signals, and this is not obtainable with three-phase motors. This fact represents a simplification in the "reading" complex of circuits of the signals on the phases, especially with an electronic drive not utilizing Hall probes.

Figure 5B:
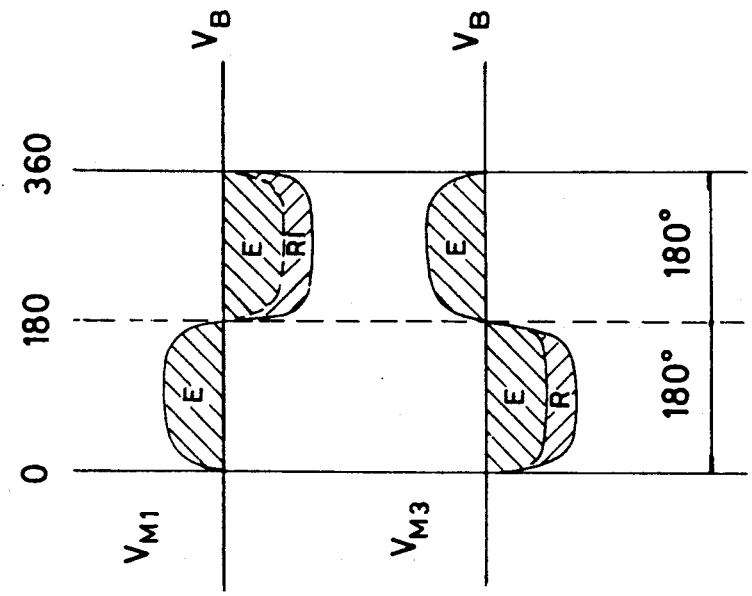
FIG. 5A–5B, illustrate the electric diagram of the motor phases.
Figure 5A:
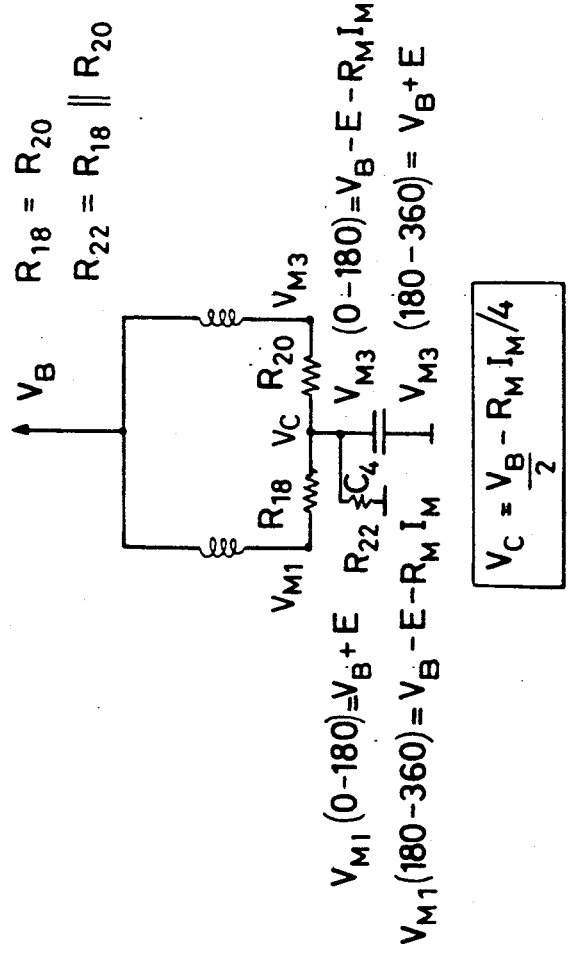
Figure 6:
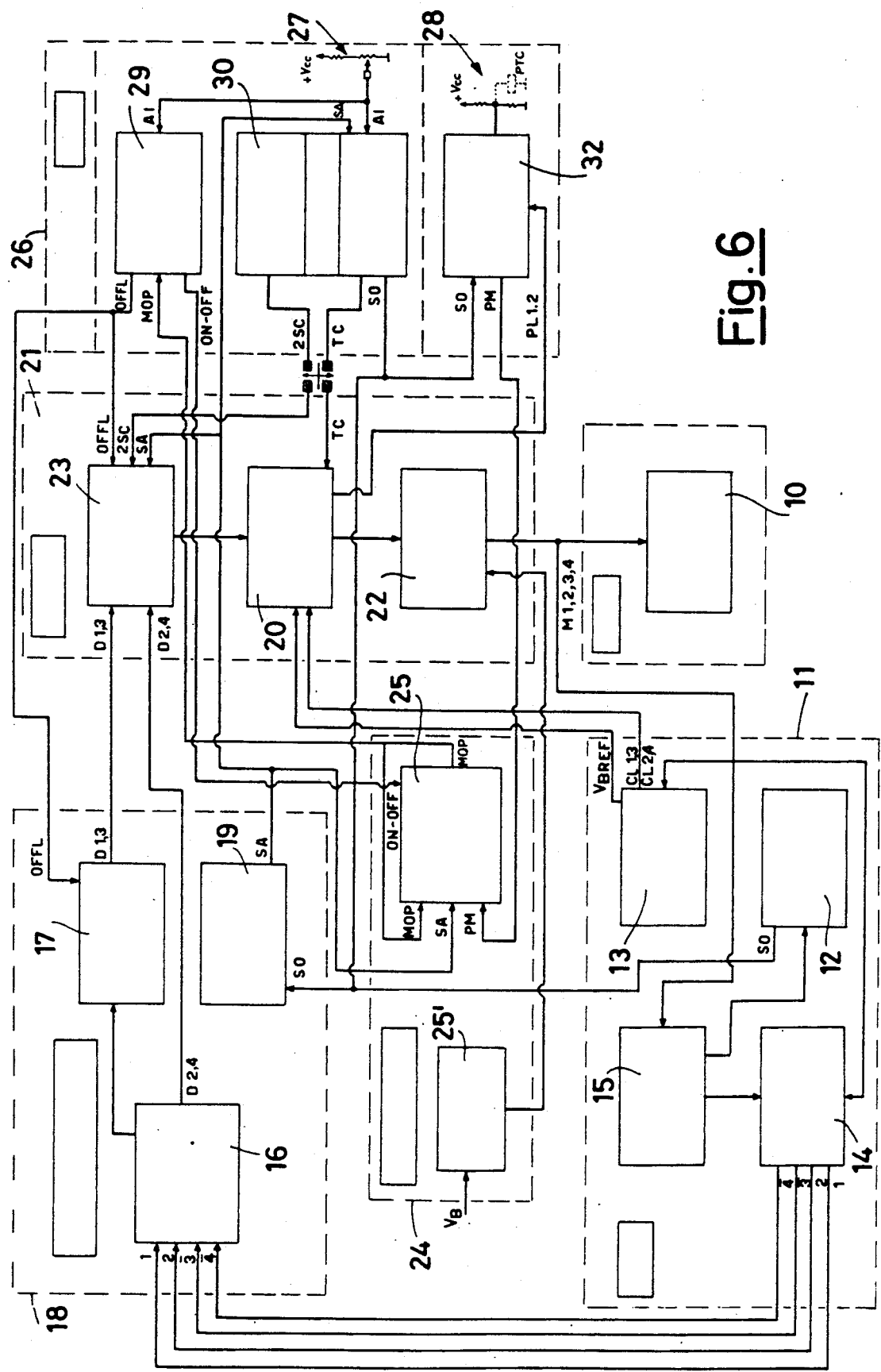
FIG. 6 is the general block diagram of the motor electronic drive.

Furthermore, a circuit for the quick "current detection" is obtainable as when connecting two resistances in differential for each of the two phases, that is at the two unipolar windings, ($M_1$ and $M_3$ are wound in the opposite sense giving E induced equal and opposite) a $V_c$ proportional to $R_m$ $i_m$ which follows $i_m$ is obtained, as RC time constant is very low with respect to the duration of each half period of i (see FIG. 5). With reference to FIG. 6, the block diagram of the electronic drive and motor control described above will be examined.

Motor block 10 consists of four windings and a biphase structure, that is two pairs of windings each representing one of the two phases of the biphase. Each phase is made of two unipolar windings wound in the opposite direction to each other, each covering a half wave of the phase.

The second block 11 may be called motor-sensors. Said block 11 has the task of gathering a set of information from the phases $M_1$, $M_2$, $M_3$ and $M_4$ of the motor 10, that is processings will be carried out on the wave forms at the end of each phase.

A speed detection logic 12 is in block 11, and said logic will obtain speed information from the above wave forms. A logic 13 for the detection of motor current and temperature through Ri drop on each motor winding is located in block 11. Said logic 13, contained in the motor-sensors block 11, has the task of transmitting this information to the logic of other blocks.

The drop of ri is intended as product Ri in which both the information of i—if R is deemed constant—and the temperature information are contained, as the resistance of the motor increases with temperature increase. Thus, with equal i, the product Ri will increase and said signal will also increase. Both values are interesting for the protection of the motor, the current circulating in it and its temperature, so product Ri is a good indication.

Motor-sensor block 11 also contains a logic for the detection of the rotor 14 position. Wave forms on $M_1$, $M_2$, $M_3$ and $M_4$ are processed by said logic which gives signals to a successive block. From said signals, useful information on the rotor position is obtained, for the further driving of the switchings in the right sequence. An advance circuit for the high efficiency of the motor and transient suppression 15 is also contained in the motor-sensors block 11. Said circuit utilizes the information deriving from the speed detection logic 12 and said signal is carried back to drive the logic for the detection of the rotor position 14 to correct the phasing of the output signals and to give an advance to switchings. It will simultaneously generate a passive filter on switching transients. The output signal of speed detection logic 12 will also be used for other logics on successive blocks.

A further block 18 may be called starting and driving logic. It consists of a unidirectional rotation logic and digital filter of transients 16. Said logic processes the signals deriving from the logic for the detection of rotor position 14—which is in the motor-sensors block 11—utilizing a latched logic (logic intended as logic circuit) and lets out driving signals of the various phases from its block, thus avoiding the motor to run in the unwanted direction. In other words, it enables the passage of logic signals if the rotor is running in the right direction, while it plugs the motor if the rotor is running in the wrong direction.

Said logic rotation block 16 also contains a digital filter logic of all transients that may arrive from the switching of the previous block, as the signals proceeding from $M_1$, $M_2$, $M_3$, $M_4$ and passing through the logic for the detection of the rotor 14 position contain spurious signals for the effect of the switchings. The dynamic unidirectional logic 16, before driving the power transistors, goes through a starting oscillator 17. Said oscillator is necessary in this system because it controls that one of the two phases in random mode be set ON/OFF, instead of the Hall probes which would communicate to the circuit the phases to be switched on and in what sequence. The above is done to shake the motor position and with such movement to permit the generation of signals on $M_1$, $M_2$, $M_3$, $M_4$ which may then be read in the logic and then begin the right phasing of the switchings on.

As signal $M_1$, $M_2$, $M_3$, $M_4$, are dynamic, they need the running of the motor so that E be generated and adequately read in order to give the entire switching on logic. As the motor at the beginning is still, there are no Es, and something to move the motor is needed. This is the purpose of the starting oscillator 17 as it puts a phase in oscillation condition at a very low preset frequency, thus enabling the motor to run. As soon as the motor runs, the above described logics for the right phasings will enter in operation and the starting oscillator 17 will be locked in the frequency of the main drive and will not operate as an oscillator any more. Said oscillator will only operate as such with still motor. As soon as the system starts and performs the lock-in, the oscillator is at lock-in on the driving frequency.

The driving logic 18 contains a starting medium logic 19. In case the motor operates with current limitation, that is if instructions to run at very low speed would be given in input, it is necessary that the motor start with a rather high torque because this is the market requirement. If inconveniences may occur, like ice in the fan, to procure small friction static torque, the motor will start with high torque. Said starting medium logic 19 feels the signal deriving from the speed detection logic 12 and if the motor runs under a certain speed it drives, with a signal of current limiters 20, so that, a high value of current that can be defined by the electronic drive goes through the four windings thus realizing and INPUT bypass an starting the motor at high rating, even if the input control indicates low rating.

When the starting medium logic 19 gets the information that the minimum speed has been overcome and the motor has started the signal disappears and the motor runs according to the normal current limitation 20.

The proper circuit of motor 21 is after the starting logic 18. From bottom to top, this block consists of power components 22, which may be four power Darlington or four MOS; the circuit for the driving of power components gives a proportional signal to the input and this will be either a speed or a torque check; circuit 20 will drive the power components 22 in linear. Said circuit 20 which drives the power components in linear is in turn checked by the driving logic of OFF states 23, for the selection of the power transistors to be driven in linear in the required way.

Said logic 23 will alternatively switch off one or the other winding and thus one or the other component executing the current limitation control of the power components.

Block 24 is called motor protection and electronics. It comprises a protection of the motor 25 and a protetion of the electronic drive 25'. The motor protection block 25 gathers a set of information in INPUT and, as can be noted in the diagram, a set of information from various levels.

It fundamentally consists in an oscillator having a short ON period and a very long OFF period, the latter one taking place in case the system finds that the motor current has overcome a level called "warning level".

After some time, an integrator feels the signal that said level has been overcome, said oscillator 25 keeps the motor ON for one or two seconds and OFF for some fifteen seconds allowing to cool and then tries again the starting system.

If the motor shutdown has some physiologic origin, for instance if a rag has fallen into the fan, and the bearing has seized, said block will continue to try the start without burning the windings as their temperature will be low due to the ON period being very short with respect to the OFF period.

The circuit of the motor protection 24 is in fact a rather sophisticated device. It is able to get various types of information as current level and fan speed. The speed signal reaches it as an information. As the description follows, said information is utilized also regarding the fan speed.

The last block 26 is input block. It consists of only one control input, potentiometer 27, because 28 is an input which aids the protection circuit and may be considered an optional; the latter one in any case is not a real control input but a setting of the desired protection threshold 32. Block 26 contains the ON/OFF logic 29 which feels the real input signal and if said signal is lower than the minimum threshold, for instance lower than 0.6 volt, it takes it as a signal to switch off the entire module, in fact it switches off the entire circuit. If above mentioned signal is higher than 0.6 volts, the block sets ON and block 30 enters in operation; said block performs various functions, according to how the components and the pins of the integrated circuit are connected. Said block 30 may perform two fixed speed checks, a continuous speed check and a continuous torque check depending on the position of the value of the signal given in input.

A detailed description of each of the above-mentioned blocks follows, referring to FIGS. 7-11.

Figure 7:
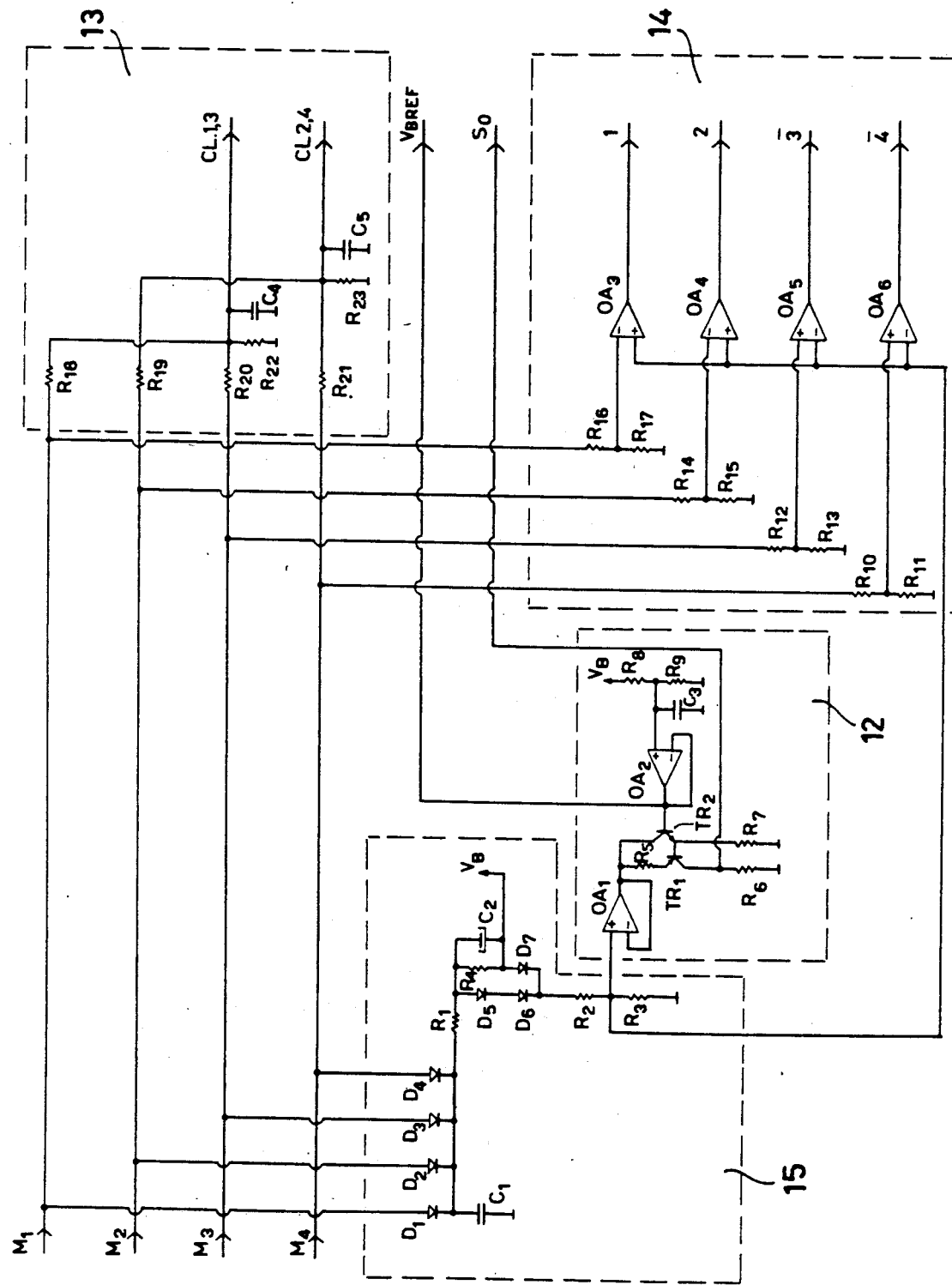
FIGS. 7–11 are detailed electric circuits of the various blocks of the diagram of FIG. 6.
Figure 8:
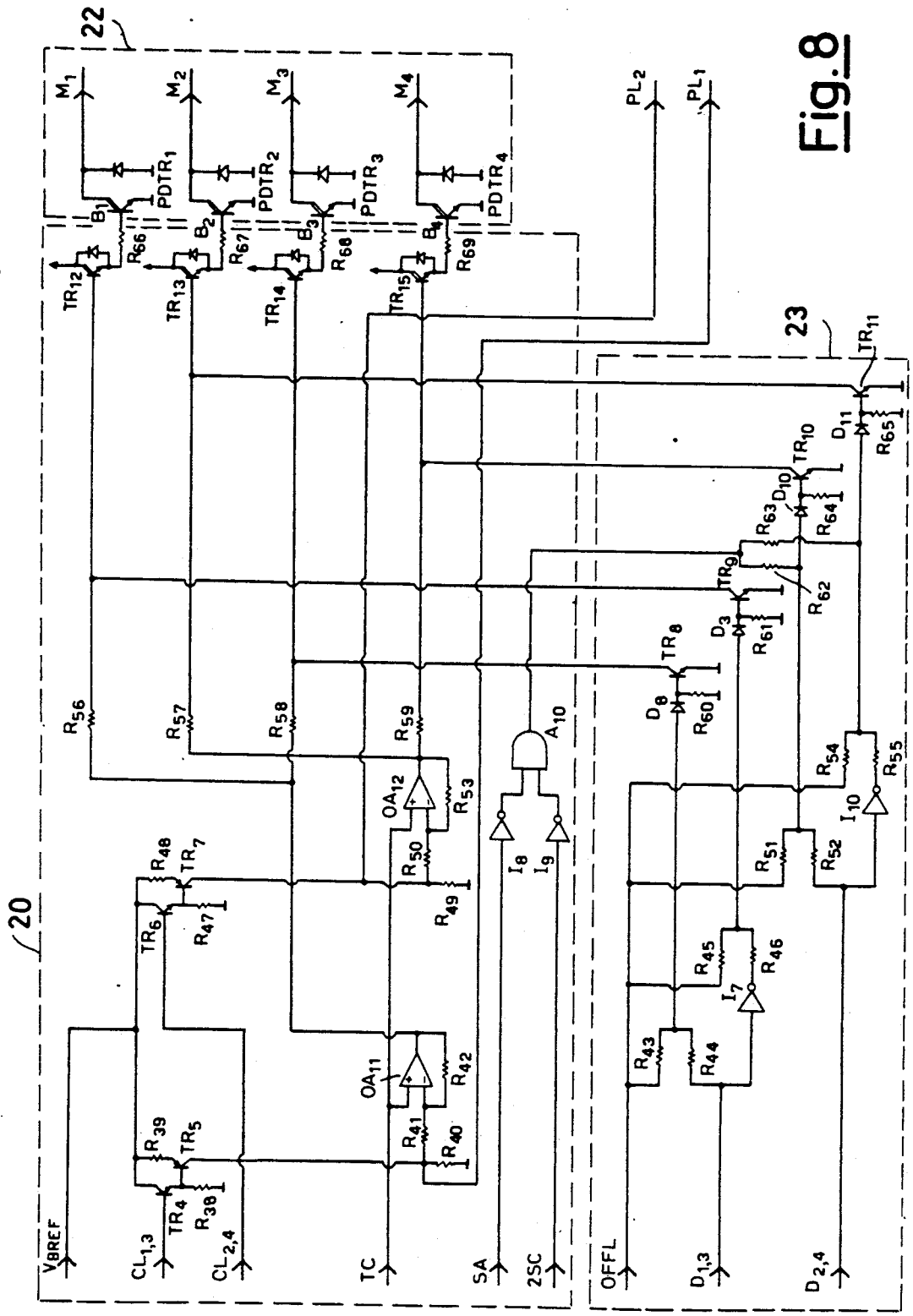

As mentioned previously, the following sunblocks may be located in the motor-sensors block 11 (FIG. 7).

Logic for the current detection and motor temperature 13, logic for the detection of rotor position 14, advance circuit for motor high efficiency and transistor suppression 15, and speed detection logic 12.

The detection of the current signal in each of the motor windings $M_1$, $M_2$, $M_3$, $M_4$ and the processing of same by the drive checking the current in logic 13 takes place employing a method which measures directly the drop of Ri in each of the phases with the processing of the information on the voltage of each winding, and the traditional method of fitting a resistance in series to each of the windings is excluded.

One of the main features of this motor is to have two windings wound in the opposite direction for each phase. Said feature is such that, if the signals $M_1$, $M_3$ are taken back through the potential divider $R_{18}$, $R_{20}$, the signal which will result from their sum is the signal Ri of the phase which is conducting.

Instant by instant, in fact, both for $M_1$ and $M_3$ the e.m.f. in the two phases is always opposite in sign; the two Es will give a null signal (see FIG. 5).

The other voltage in the windings is inductive L di/dt, but this, too, will be of equal type and opposite in sign on the two windings, as the two windings are opposite, so these voltage drops will be cancelled in the nodes of the resistances $R_{18}$, $R_{20}$. In each half wave, instead, only one of the windings will be conducting $M_1$ or $M_3$ and in it the conducting winding will have a Ri on its signal, said Ri will not exist on the other winding, and the resulting signal from this potential divider and filtered by the condenser $C_4$ for quick signals and attenuated by resistance $R_{22}$ will give a $CL_1$ signal when $M_1$ is conducting, and $CL_3$ when $M_3$ is conducting which will be equal to the respective product Ri. The same thing may be said for $M_2$ and $M_4$ so the explanation will not be repeated for them. Each of the two lines of output signals will then cover 50% of the signal of a winding and 50% of the signal of the other winding. As the signals $CL_{1,3}$ and $CL_{2,4}$ are equal to the product R of the windings by i, and as the resistance of the windings is variable depending on the temperature of same, said signals $CL_{1,3}$ $CL_{2,4}$ will tend to increase with the increase of i and also with the increase of R which takes place with the increase of the winding temperature. This is the reason why block 13 is also called block for the detection of motor temperature.

Block 14 consists of four comparators $OA_3$, $OA_4$, $OA_5$, $OA_6$ having analog input signal $M_1$, $M_2$, $M_3$, $M_4$ and giving square wave output with state passage in correspondence with passage of $M_1$, $M_2$, $M_3$, $M_4$ for the level established by the potential divider $R_2$, $R_3$ of block 15.

The detection of block 14 is then carried out on zero established by said potential divider $R_2$, $R_3$. The signals that can be utilized on the successive logic are 1, 2, $\bar{3}$ and $\bar{4}$ so the block 14 comparators have been connected to avoid to insert reversers to obtain the signals $\bar{3}$, $\bar{4}$.

During switchings, the signals on $M_1$, $M_2$, $M_3$, $M_4$ may generate extra voltages in the OFF states of each transistor, due to stray inductances that could damage the power transistors. Block 15, to avoid this, has diodes $D_1$, $D_2$, $D_3$, $D_4$ through which a condenser $C_1$ is reached which has the task of absorbing the switchings that are never simultaneous, during said transistors. Said block 15, apart from the task of filtering said extra voltages through $C_1$, also has the task of detecting the value of E with respect of $V_B$ for each phase as said signal is utilized to bias circuit 14, already examined, through resistances $R_2$, $R_3$, giving it a variable reference with the motor speed.

An advance on the switching will be generated because the detection on the square wave on 1, 2, $\bar{3}$, $\bar{4}$, will be carried out referring to a voltage level increasing more and more according to speed. In fact, the signal in output from $D_1$, $D_2$, $D_3$, and $D_4$ will be made of a transient of the switchings and of e.m.f. signal which will alternatively be present on one of the two phases. Said signal, referred to $V_B$ will be attenuated with respect to $V_B$ in ratio $R_4/(R_1+R_4)$ where said attenuation will be set up motor by motor depending on the desired advance on switching. The attenuated signal in the ratio $R_4/(R_1+R_4)$ is the one appearing through the potential divider $R_2$, $R_3$. The signal downstream of $D_1$, $D_2$, $D_3$, $D_4$ is filtered by the condenser $C_2$ to give a continuous component representing a proportional signal to the speed of the motor.

Block 12 gives SO signal in output; said signal is proportional to the motor speed and is obtained as difference between the signal at the end of the potential divider $R_2$, $R_3$ read by the operational $OA_1$, and a signal $V_B$ read by the operational $OA_2$, in order to cancel $V_B$, also present on the potential divider $R_2$, $R_3$ from the differential utilization of the two operationals $OA_1$, $OA_2$, which takes a signal only proportional to the speed of the motor on the resistance $R_6$.

The control circuit 21 (FIG. 8) comprises a block of power components 22 made of four power transistors $B_1$, $B_2$, $B_3$, $B_4$ and four inversely biased diodes set in parallel, for the absorption of the transients in the windings driven by each of the transistors which would bring the commutator in negative. Block 20 has the task of transferring the information of signals $CL_{1,3}$ and $CL_{2,4}$ relating to drops Ri in the various windings to drive power components. As the circuits for signal $CL_{1,3}$ and $CL_{2,4}$ are identical, only the one relating to $CL_{1,3}$ will be examined.

Apart from Ri, the signal $CL_{1,3}$ also contains an "error" signal due to the fact that the windings $M_1$, $M_3$ are referred to $V_B$ feeding so that a variation in the feeding voltage is carried over on the potential divider $R_{18}$, $R_{20}$ (see above), thus giving in $CL_{1,3}$ a signal indicating the feeding voltage variation. To cancel said information, on the resistance $R_{40}$ a signal is generated, proportional to the difference between $CL_{1,3}$ and $V_B$ excluding this information which is not pertinent with the required drop Ri.

The signal on $R_{40}$ goes to an amplifier $OA_{11}$ which, with its output by means of a power amplification expressed by transistors $TR_{12}$ $TR_{14}$, drives in linear mode the respective power transistors of the windings $M_1M_3$. Said approach for the linear drive of the motor through a current control not only gives the best dynamic answer of the speed control system, as it is known by automatic controls, but, as a collateral performance, also "flattens" the current wave form in the windings giving a current wave form Practically in d.c. line, with a minimum harmonic content and reducing to the minimum electrical and mechanical noise. The drive through $OA_{11}$ is carried out through resistances $R_{56}$, $R_{58}$. As only one output proceeds from $OA_{11}$ to drive both windings, the signal on the winding which must not be switched on must be cancelled for a certain time. Logic 23 will then ground the output signal from $R_{58}$ or $R_{56}$ and the wanted signal will be passed on to the pertinent winding. The clean signals which are present on $R_{40}$ and $R_{49}$ and called $PL_1$ and $PL_2$ are also utilized in circuit 32 the description of which is following upon.

Circuit 20 also contains signals SA and 2SC which, through the logic shown in the drawings, switch off the two power transistors; said transistors drive $M_2$ and $M_4$ setting the transistors $TR_{10}$ and $TR_{11}$ ON. Two of the four windings representing one of the two phases may thus be switched off and the motor will run in single phase. Logic 23 with the signal OFF sets ON the four transistors, $TR_{8-11}$ and switches off all the power transistors, while $D_{1,3}$ and $D_{2,4}$ that are logic signals enabling the switching one of the power transistors, switch on and off the various $TR_8$ $TR_9$, $TR_{10}$ and $TR_{11}$ to set the power transistors ON in the desired logic sequence.

In the input block 26 (FIG. 9), we find first of all block 29 ON-OFF having two inputs and two outputs. The first input AI is sent to an amplifier with hysteresis $OA_{13}$ which refers input AI to a fixed threshold on diode $D_{12}$. When the input overcomes said threshold which is being read by operational $OA_{13}$ with a certain hysteresis, a change of state will occur, due to resistances $R_{71}$ and $R_{74}$, in the operational output to give a consent signal to the entire module. Said ON-OFF signal will drive the block of logic 23, already described.

From said block 29, a signal OFFL originates which is different from the previous one because it drives a different logic in OR with $O_6$ with a signal deriving from the protection circuit MOP.

Figure 9A:
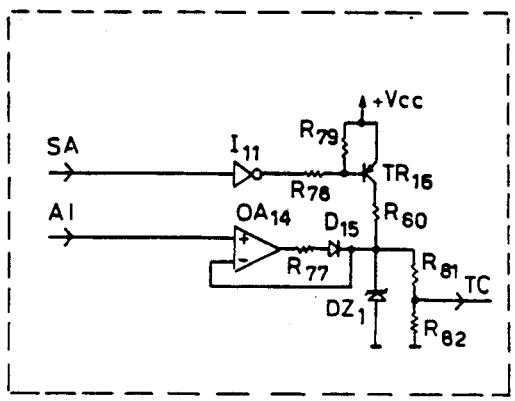
Figure 9B:
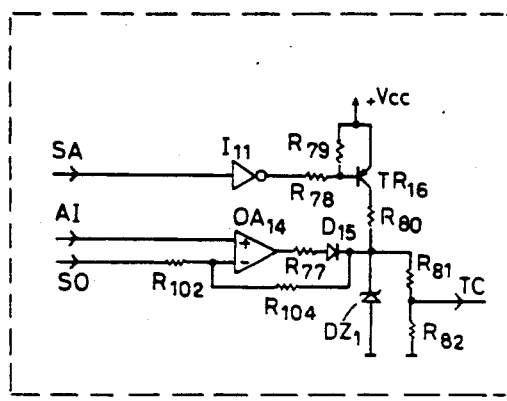
Figure 9C:
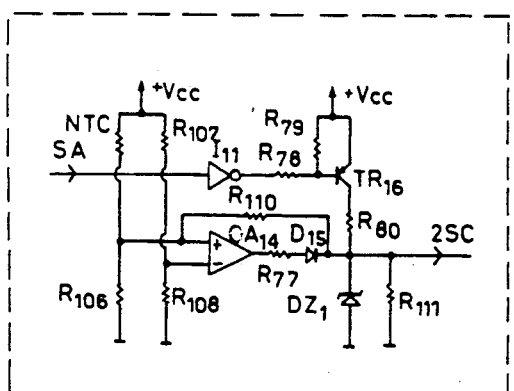
Figure 9D:
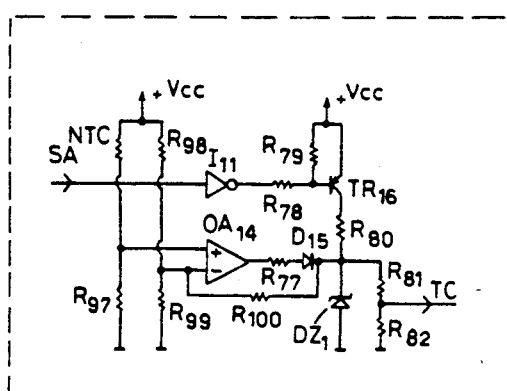
Figure 9E:
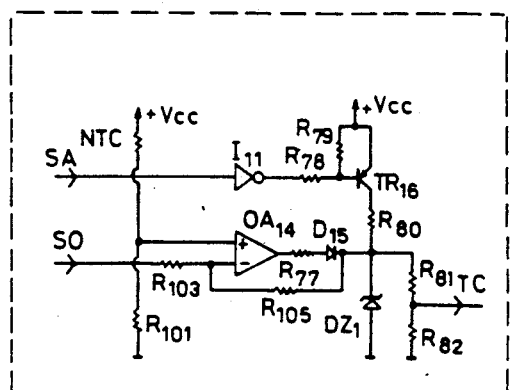
Figure 9F:
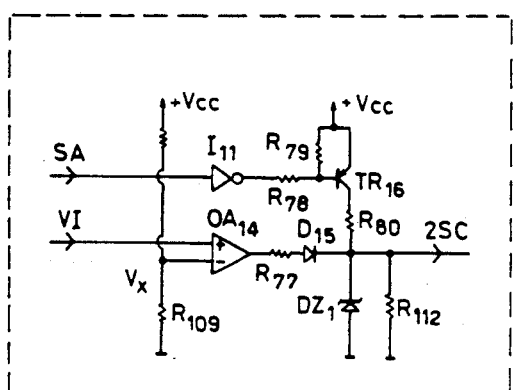
Figure 10:
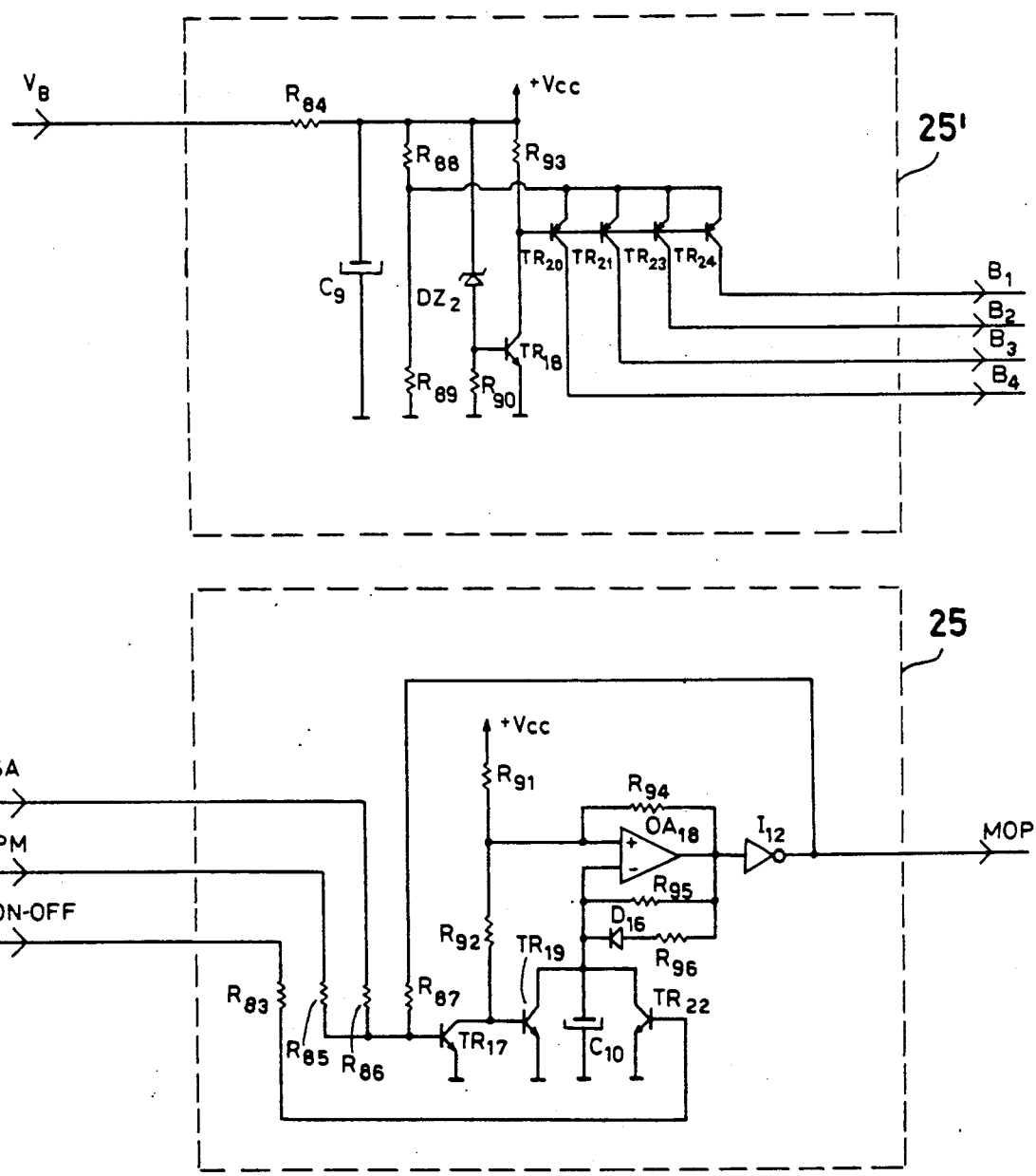

The second block 30 features two distinct functions; one regards the handling of signal AI which through the operational $OA_{14}$, gives output signals 2C and TC which are proportional to the driving input. The operational $OA_{14}$, may be embodied in different ways as for example those clearly illustrated in FIG. 9a-9f wherein the circuit of FIG. 9a performs a torque control, while the one of FIG. 9b carries out a speed control, and the circuit of FIG. 9c a two speed control with sensor NTC; the circuit of FIG. 9d is like the one of 9a but has an NTC input; the circuit of FIG. 9e is like the one of 9b with NTC input and the circuit of FIG. 9f is like the one of 9c with a three states input to handle ON-OFF and two speeds.

The other part of block 30 linked to the signal SA sets the transistor $TR_{16}$ ON which forces the output of the feedback amplifier employing the operational $OA_{14}$ to the maximum possible level and limited by zener DZ whatever the AI output. As the signal SA is only present at the moment of the motor start, and it disappears when the minimum level of preset speed is reached, the presence of 2 SC and TC at the maximum of their value at the start is due to the fact that the start of the motor is always required with the maximum torque. This to avoid problems at the start of the motor due to accumulated dirt or frost. Signal TC is used for the continuous current control in circuit 21 while signal 2SC is used when the application with controlled motor on one or both phases is desired.

The third circuit 32 generates a signal PM which communicates to block 25 that the protection circuit has entered in operation. Signal PM will exist, that is it will be in state 1, when one of the inputs $PL_1$, $PL_2$ through the operational $OA_{15}$ $OA_{16}$ (the one of the highest value) will communicate to the $OA_{17}$ input a higher level than the one present at the other $OA_{17}$ input. Said level $PL_1$, $PL_2$, as mentioned, is proportional to the current in the phases. In other words, at the + input of $OA_{17}$ the higher current level of each of the four windings will appear. On the - side of $OA_{17}$, two types of signals may appear: one is SO, proportional to the motor speed, and another one derives from the potential divider $R_{114}$, $R_{115}$ that may be prefixed from the exterior. The output 1 from $OA_{17}$ will occur when the currents in the phases will overcome the level on the - side of $OA_{17}$ for each value of SO and prefixed thres hold given by $R_{114}$, $R_{115}$. Said condition that may be handled motor by motor thanks to the potential divider, provokes the detection of a danger condition, which is different depending on the speed levels of the motor, as with equal current in input, the threshold of the comparation of current signals varies with speed through the SO signal. The motor and its electronic drive, in fact, are cooled by the rotation speed of the motor, so higher current levels with higher speed are allowed without this being a danger condition. The low speed condition with high current levels instead is emphasized by the fact that with the lowering of SO the threshold for the comparation of current levels is lowered.

The block for the motor protection and electronics 24 comprises (see FIG. 10) a block for the electronics protection 25', its input being $V_B$ filtered through $R_{84}$ and the condenser $C_9$. $V_B$ generates a +Vcc feeding available to the electronic drive regulated by zener $DZ_2$ and by transistor $TR_{18}$.

Furthermore, on the commutator of $TR_{18}$ there is a resistance $R_{93}$ which, in normal operating conditions is configured to have a lower drop at its ends than the voltage to which the emitters $TR_{20}$, $TR_{21}$, $TR_{23}$, $TR_{24}$ are biased through the potential divider $R_{88}$, $R_{89}$. This means that in normal working conditions the circuit including $DZ_2$ and $TR_{18}$ operates only as $V_B$ voltage adjuster generating a more or less constant Vcc for the electronic drive. In case $V_B$ overcomes a prefixed level, the transistor $TR_{18}$ will have to absorb over more current as Vcc tends to remain constant. Said current will generate an ever increasing drop on $R_{93}$ until it overcomes the bias threshold of the emitter of $TR_{20}$, $TR_{21}$, $TR_{23}$, $TR_{24}$ setting them ON. At this moment, they will set ON the four bases $B_1$, $B_2$, $B_3$, $B_4$ of the transistors and a remarkable amount of short circuit current will be absorbed by the line deriving from all four motor windings. Said abnormal current absorption may burn the fuse or lower the transient on the battery. In both cases, a protection of the electronic drive will occur.

The second block 25 is substantially a relaxation oscillator driven through $TR_{17}$, $TR_{19}$, $TR_{22}$ and through signals SA, PM and ON-OFF generating an output signal MOP utilized by logic 29. The signal ON-OFF through $TR_{22}$ will enable the oscillator to operate when the module is operating and will keep the condenser grounded if the module is off. $TR_{17}$ instead is driven by PM, SA and MOP, and when it is kept ON it switches off $TR_{19}$, keeping the base grounded, thus the condenser $C_{10}$ of the oscillator will be enabled to oscillate so the oscillator will begin to give a square wave MOP signal as drive signal of ON/OFF protection states. The MOP signal is carried back to the input through $R_{87}$ to avoid that when the protection circuit switches off the power components, said signal disappears at PM or SA input re-enabling the operation of the oscillator. When the electronic drive must be OFF because it is protected, through the MOP signal and the resistance $R_{87}$, $TR_{17}$ is being kept ON so that the oscillator is not disturbed during the entire protection phase.

ON and OFF time of the oscillator are different, as ON time lasts a few seconds with an OFF time five-six times higher; the mean value of ON time must be very small so that the mean heating of the motor be lower than heating in the normal operating condition. No thermal damages occur to the motor thanks to the ratio between low ON and high OFF time.

The motor will try to restart at each cycle and this will occur if the impediment has been removed. If not, the oscillator will continue to oscillate keeping a nondangerous overvoltage and overcurrent condition.

The charge and discharge resistance of $C_{10}$ is splitted in a $R_{95}$ to obtain an ON time different from an OFF time; said $R_{95}$ in one direction is in parallel with $R_{96}$ when the condenser is charged, while in the other direction $R_{96}$ will only operate because diode 16 will not allow $R_{95}$ to operate; consequently charge and discharge times are different and, as mentioned before, generate different ON and OFF times.

Figure 11:
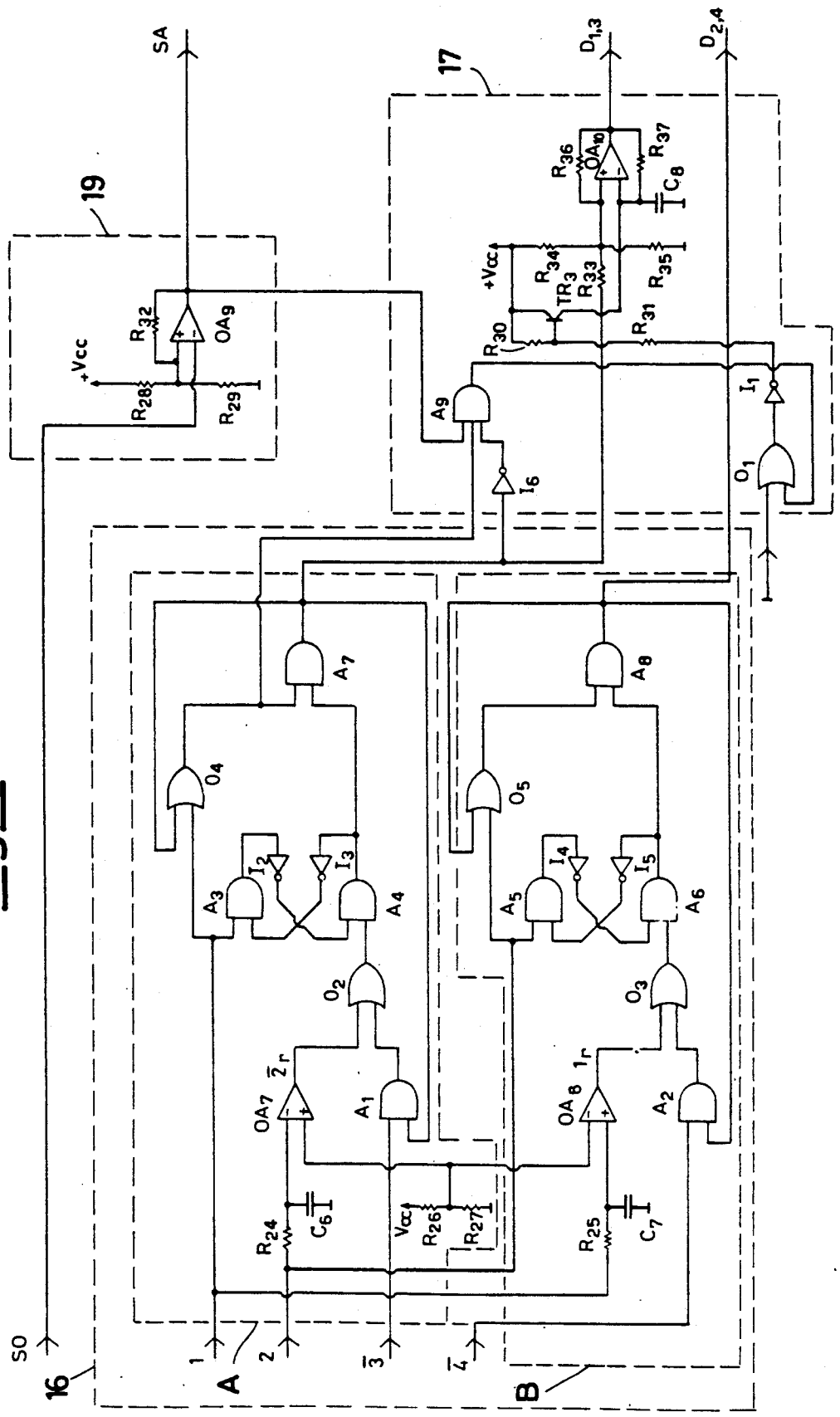

Referring to FIG. 11, we are only going to examine the part comprised in the dashed section A of the diagram of block 16 called unidirectional rotation and transients digital filter logic. Said part regards the drive $M_1/M_3$ which is identical to drive $M_2$, $M_4$ illustrated in dashed section B.

The drive of the two windings of the phase $M_1/M_3$ is relied to the processing of signals $1,2,\overline{3}$, deriving from the "rotor position detection" block, already examined.

Figure 12:
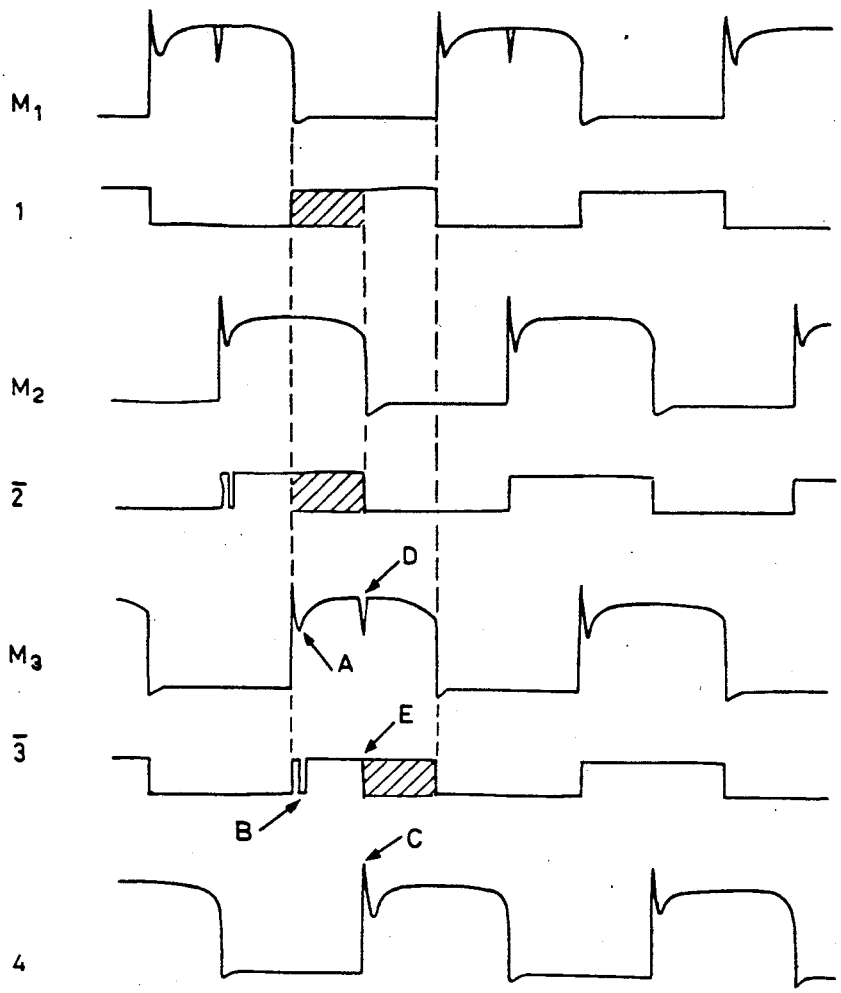
FIGS. 12 and 13 are wave form diagrams referring to circuit of FIG. 11.

With reference to FIG. 12 which illustrates the wave forms on the four windings of the motor ($M_1/M_3$ for one phase, $M_2/M_4$ for the other one) with the relating logic signals generated by the motor-sensors block for a desired rotation direction, a possible driving logic for $M_1$ can be observed (the drive of $M_3$ will simply be the negated of the driving signal of $M_1$ as the required feeding of $M_1$ and $M_3$ will be at 180° electrical); said driving logic is $1\ \overline{2}+\overline{3}$, that is "OR" between "$\overline{3}$" and "AND" of signal "1" and "$\overline{2}$". In fact, as the drive of $M_1$ and $M_3$ must be at 180° and in phase with the respective e.m.f., it can be seen that $M_1$ must be "ON" until a positive e.m.f. is read on $M_3$, that is a higher $V_B$ and in particular at the level established by the reference threshold, thus generating $\overline{3}$ high.

Figure 13:
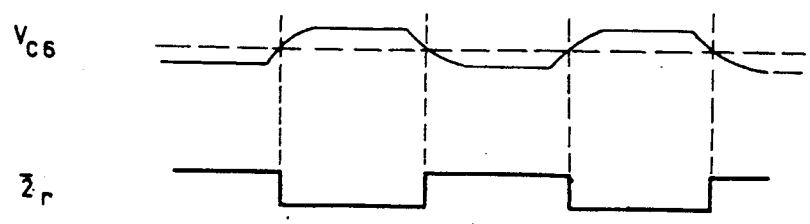

AND of "1" and "$\overline{2}$" which lasts for the first 90° during which it results $\overline{3}$ high is being set in "OR", to avoid that the switching transient present on $M_3$ at the switching off of the pertinent transistor (FIG. 12, part A—evidenced only in hatched area) may generate a signal $\overline{3}$ low (FIG. 12 part B) which would switch off $M_1$ and switch on $M_3$ triggering the oscillations, thus masking the transient on "$\overline{3}$" just described. Such base logic has been reinforced with other artifices to render it both immune to the switching transients induced by the phases at 90°, and able to generate a sequence of driving signals only if the rotation direction is the required one. The delayed immunity to switching transients present on "$\overline{3}$" at 90° with respect to the switching off instant of M (FIG. 12, points C,D,E) is obtained delaying signal "2" with group $R_{24}C_6$ and the comparator unit consisting of $R_{26}$, $R_{27}$ $OA_7$; signal "2" is also being inverted as it is proposed at the "inverting" input of $OA_7$ (FIG. 13).

In this way, AND $1\ \overline{2}_r$ is extended over the transient on "$\overline{3}$" deriving from switchings in the windings $M_2/M_4$, already described. Suffix r has been added to "$\overline{2}$" to indicate such shifting operated on signal $\overline{2}$. The generation of a driving sequence (that may be followed at the output of gate $A_7$), only if the rotation is the right one, has been obtained with the "block" utilizing the gates $A_3, I_2, I_3$, $A_4$, $A_7$.

Said circuit has the purpose of carrying out "AND" between the signals "1" and "$\overline{2}$" only if signal "1" in input at $A_3$ arrives after the signal "$\overline{2}_r$"in input at $A_4$. In fact, if the sequence is correct (FIG. 12) the signal "$\overline{2}_r$" arrives before, and we will get at circuit input the situation as in the following Table:

| Signals | "before" level | "after" level |
|---|---|---|
| "1" | 0 | 1 |
| "$\overline{2}_r$" | 1 | 1 |
| $A_7$ | 0 | 1 |

Signal 0 at input of $A_3$ staticizes the output of $A_4$ at level 1. It may easily be seen that the output of $A_4$ remains in said state also when the input "1" goes from level 0 to level 1. When this occurs, the output of AND $A_7$ will go to 1, that is the block will have performed AND of signals "1" and "$\overline{2}$". In case of rotation in the opposite direction to the desired one, the situation will be as follows:

| Signals | "before" level | "after" level |
|---|---|---|
| "1" | 1 | 1 |
| "$\overline{2}_r$" | 0 | 1 |
| $A_7$ | 0 | 0 |

0 on the input of $A_4$ generates a 0 at the output of $A_4$ As the other input of $A_4$ is taken to 0, the passage of the signal "$\overline{2_r}$" from level 0 to level 1 leaves the output of $A_7$ to 0, then the output of $A_7$ remains at 0 level.

Therefore, in this second hypothesis AND of the signals "1" and "$\overline{2_r}$," is not executed. Gate $O_4$ has been added to the circuit with the purpose of making the driving logic insensible to any type of disturbing signals and operating only in case of correct rotation; said gate has the purpose of creating a latch in the output driving signal at $A_7$ acting in that way as a filter with respect to transients present on the input "1" when the output of $A_7$ level has reached level 1.

Gates $A_1$ and $O_2$ realize "OR" of $1 \overline{2_r}$ with $\overline{3}$ only if output of $A_7$ is 1, which occurs only if the rotation direction is the right one.

As can be seen by FIG. 11 (point B—hatched area) the driving to the windings $M_2/M_4$ of the second phase is perfectly identical to what we have just indicated regarding the windings $M_1/M_3$ of the first phase, realizing the logic $2\ 1\ +4_r$ with AND of signals 2 and $1_r$, carried out only if 2 arrives after $1_r$.

Block 19 is substantially a hysteresis circuit comparing the speed signal SO to preset thresholds. SA output signal will be "high" when the speed is under a present level and normally corresponds to a speed value which is a small percentage of working speed. This logic serves to discriminate the starting transient from the speed condition. Block 17 consists of a relaxation oscillator of known type and realized by operational $OA_{10}$ and by resistances $R_{34}, R_{35}, R_{36}, R_{37}$ It is inserted on the driving line $D_{1,3}$ and is characterized in that it carries thresholds, among them the condenser $C_8$ may oscillate alternately through resistance $R_{33}$ from the state 0 or 1 of $D_1$. The embodiment of $R_{33}, R_{34}, R_{35}, R_{36}$ is such that for $D_1$ constant (corresponding to a "reading" of still motor) the oscillator will oscillate on its own frequency changing alternately $D_{1,3}$ and thus in sequence switching on $M_1$ and $M_3$ ignoring the correct phase relationships. This will procure a casual movement of motor rotor which, generating e.m.f., will supply to the above described rotation logic the information to generate the correct signals on $D_1$ from the synchronization point of view to obtain a rotation in the required direction. The state variations of $D_1$ are such to condition the oscillator to lock in the frequency and the phase of $D_1$. In other words, as regards state changes of $D_1$ the signal $D_{1,3}$ in output from the oscillator will result exactly equal to $D_1$.

The above-described synchronized oscillator is also characterized in that an operating lock logic is conditioned either by signal OFFL, high with motor off, or through $0_1$, locked by logic $A_9$, $I_6$ which gives a high signal, thus a lock signal, if SA is high and the motor is running in the wrong direction, and so with 0 on $D_1$ and alternating of 0 and 1 at the output of $0_4$. This last solution is necessary to avoid that the oscillator generates undesired switchings on $M_1, M_3$ if a casual start in the wrong direction takes place.

What is claimed is:

1. A direct current, brushless, biphase motor and a motor drive circuit, comprises: four unipolar windings and an electronic drive; a trapezoidal e.m.f. being generated in each winding; said trapezoidal e.m.f. allowing the electronic drive to sense the best switching point on an oblique side of a trapezoidal wave; said windings being configured to form two phases which are embodied to obtain conduction on 180° per winding as two single-phases in paralle; said motor being capable of being used in a first single-phase mode, a second single-phase mode and a third biphase mode wherein the motor selected by the drive among the first, second and third modes absorbs a substantially direct current from a line due to said mode selection to set in operation each phase with a conduction on 360° (180° + 180°) for each of the two single-phases; and said electronic drive further comprises:

a "motor-sensors" block which detects position of a rotor, speed and Ri drop on the windings through the processing of voltage wave forms present at the ends of said windings;

a "starting and driving circuit" block which processes signals proceeding from the "motor-sensors" block to generate a motor starting and a sequence of driving signals of the switching on each winding to ensure rotation to occur only in the right direction and to obtain the best efficiency of said switchings;

an "input" block comprising an analog or digital input which controls the motor as regards speed or torque in a continuous way, or selects the running from single-phase to biphase; said input block also driving an ON-OFF state and staticizing a protection threshold for said motor at a preset level, on another input;

a "motor and electronic drive protection" block which processes signals relating to motor speed, current in the windings, and a preset protection threshold, and which determines the intervention of an oscillator which sets the motor ON-OFF, with sufficiently short ON times with respect to OFF times in order to protect the windings and electronic components until an anomalous condition persists; and a "control circuit" block which act as the interface between all the above mentioned blocks and the windings of the motor, and controls both the ON-OFF state and the current level in said windings.

2. The motor and drive circuit according to claim 1 wherein the "motor and electronic drive protection" block conditions the maximum current allowed, and taking into account the cooling effects of rotor rotation on the motor and on the drive circuit.

3. The motor and drive circuit according to claim 1 wherein the "control circuit" block utilizes a linear current control for controlling the speed and torque in an "outputs" block, which brings electrical and mechanical noise to a minimum.

4. The motor and drive circuit according to claim 1 wherein the "motor-sensors" block comprises a definition logic of the switching point with a threshold which varies with the motor speed; and said motor intercepts the increasing level of e.m.f. with speed and generates a dynamic switching advance.

5. The motor and drive circuit according to claim 1 wherein in the "motor-sensors" block, the Ri drop is detected by a circuit which carries out the difference between the signals on the two windings having the same phase.

6. The motor and drive circuit according to claim 1 wherein the "starting and driving circuit" block generates the starting by means of a "synchronized" oscillator which oscillates the rotor to generate e.m.f., on the frequency of which the oscillator is synchronized.

7. The motor and drive circuit according to claim 1 wherein the "starting and driving circuit" block generates the driving signals which ensure the unidirectional rotation by processing logic signals not only in a static way but also depending on a time succession of said logic signals.

8. The motor and drive circuit according to claim 1 wherein the "input" block always ensures the start in the biphase mode and in the desired rotation direction when the single-phase mode motor operates.

9. The motor and drive circuit according to claim 1 wherein the input block comprises a circuit ensuring the start of the motor with the maximum allowed current in order to overcome possible static frictions, and maintaining said state until a minimum preset speed is reached.

10. The motor and drive circuit according to claim 1 wherein the motor running in the single phase or biphase mode gives the possibility of obtaining a two-speed system which maintains, in both working modes, power transistors which conduct in saturation with a minimum possible power dissipation.

* * * * *